June 4, 1963 R. M. SELBY 3,092,367
FOLDING BOOM

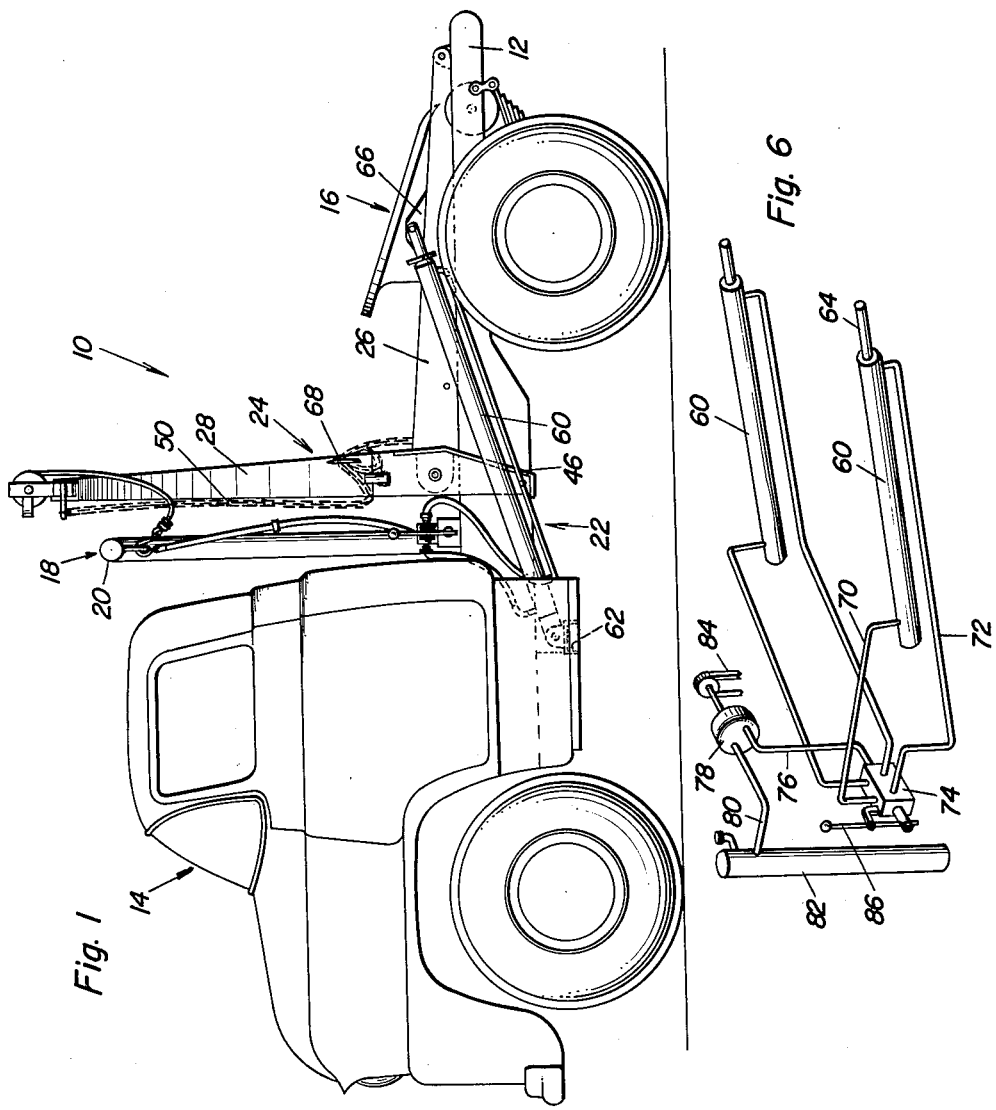

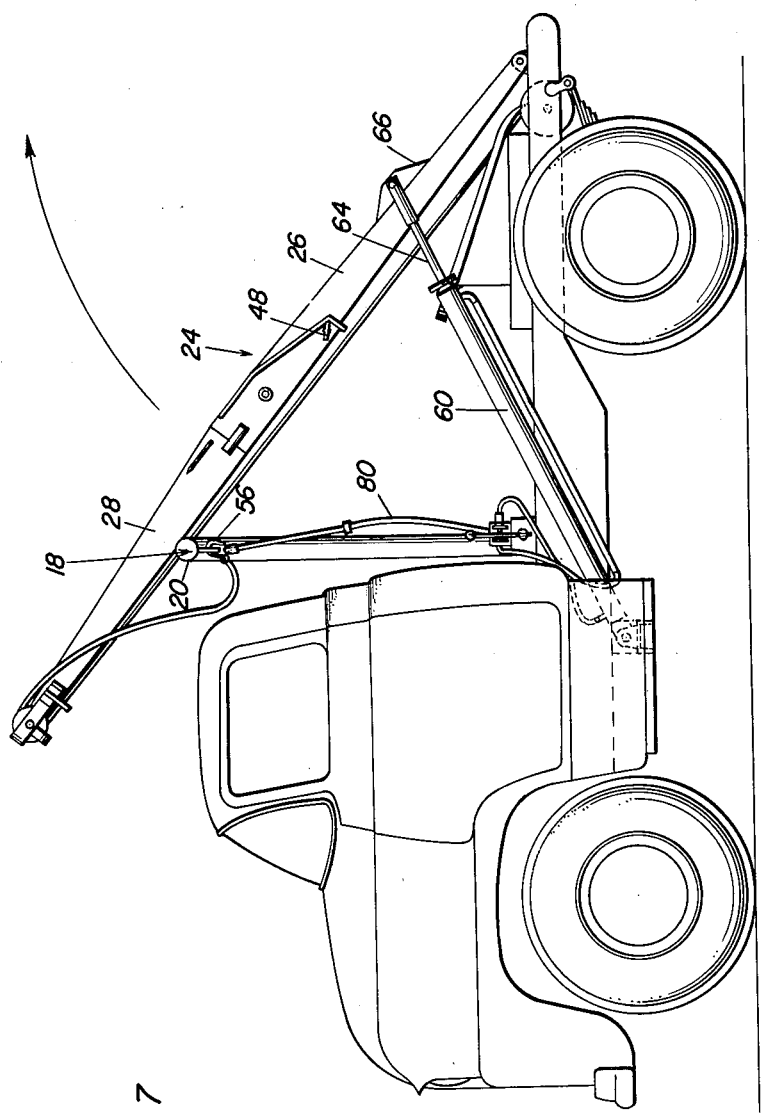
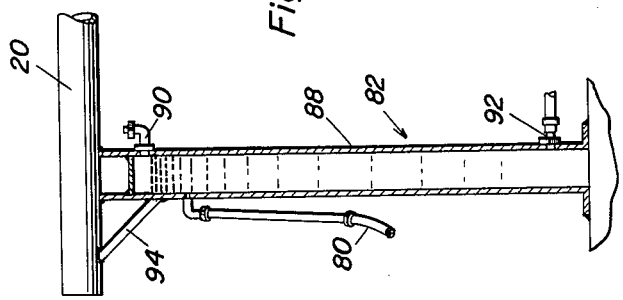

Filed July 11, 1961 4 Sheets-Sheet 3

Robert M. Selby
INVENTOR.

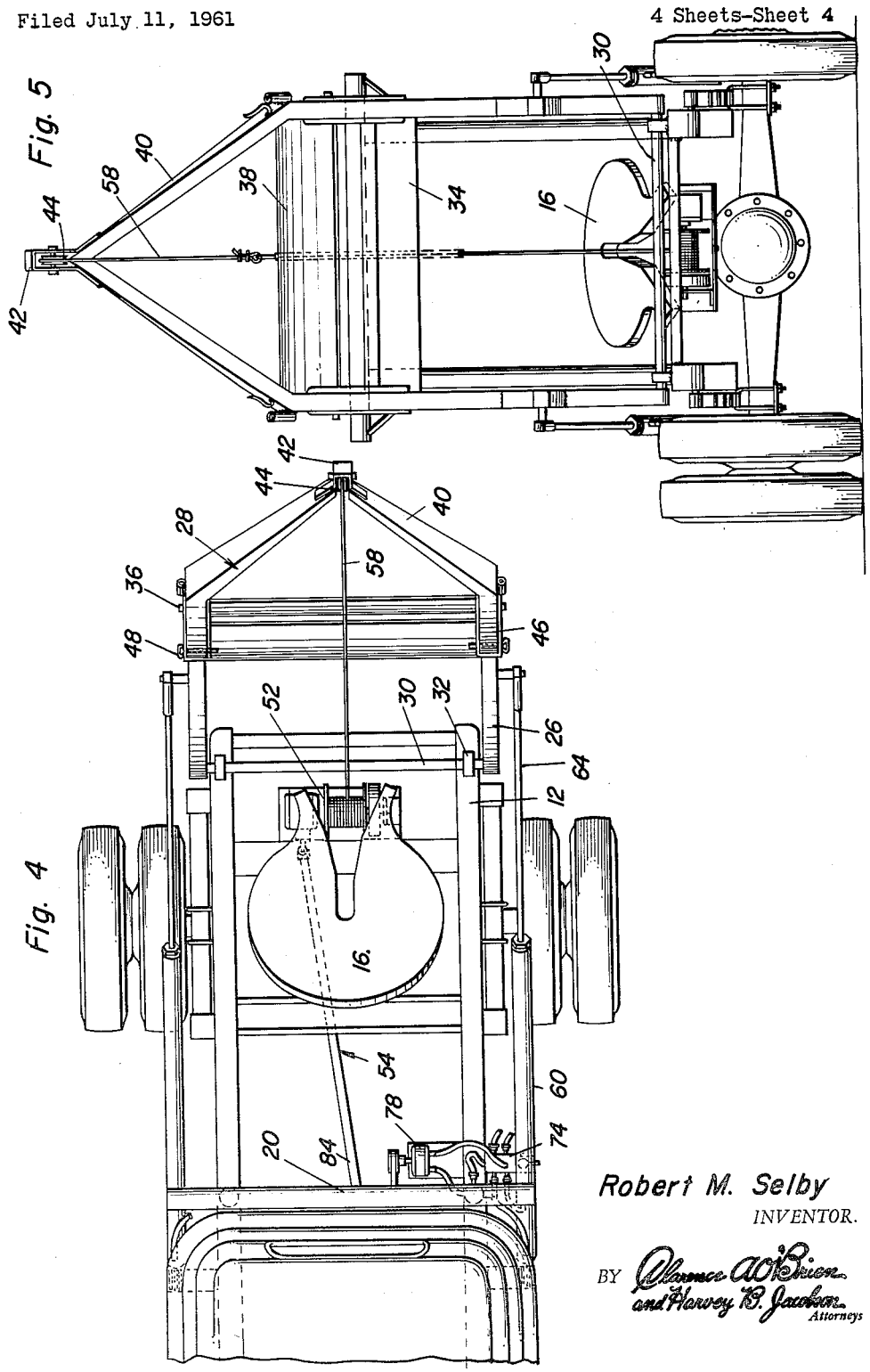

United States Patent Office 3,092,367
Patented June 4, 1963

3,092,367
FOLDING BOOM
Robert M. Selby, Nicollet, Minn.
Filed July 11, 1961, Ser. No. 123,205
9 Claims. (Cl. 254—139.1)

This invention relates to folding boom assemblies and more particularly to a folding boom assembly mounted on a truck tractor vehicle.

The present invention is concerned with the handling of loads by equipment mounted on a truck tractor type vehicle to which truck trailers may be connected. The novel boom assembly to be hereafter described, is accordingly securely arranged to be folded more efficiently into an out-of-the-way folded position than was heretofore thought possible for comparable truck mounted assemblies of comparable load sustaining capacity and provide a folded out-of-the-way assembly having the safer and less projecting attributes of the present folding boom assembly.

Accordingly, it is a primary object of the present invention to provide such a folding boom assembly which when in an extended position will substantially overhang and project from the rear of a truck tractor for load engagement purposes and yet be folded into a position against the truck frame and the cab guard thereof in a safer disposition than was heretofore thought possible.

Another object of this invention is to provide a folding boom assembly which is moved between its folded retracted position and its rigid extended position by power operated hydraulic piston cylinder devices which are operative in cooperation with the cab guard disposed rearwardly of the truck tractor cab for effecting a novel and efficient folding of the boom into its finally retracted position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a truck tractor type vehicle with the novel folding boom assembly installed thereon and disposed in its retracted and folded position.

FIGURE 2 is a side elevational view of the truck tractor mounted folding boom assembly illustrated in an extended and partially retracted position.

FIGURE 4 is a top plan view of the arrangement shown in FIGURE 3.

FIGURE 5 is a rear elevational view of the arrangement shown in FIGURE 3.

FIGURE 6 is a diagrammatic perspective view of the hydraulic circuit for the power operated boom actuating mechanism.

FIGURE 7 is a partial sectional view of one of the cab guard supports which also constitutes the fluid reservoir for the hydraulic power operated mechanism.

Figure 3:
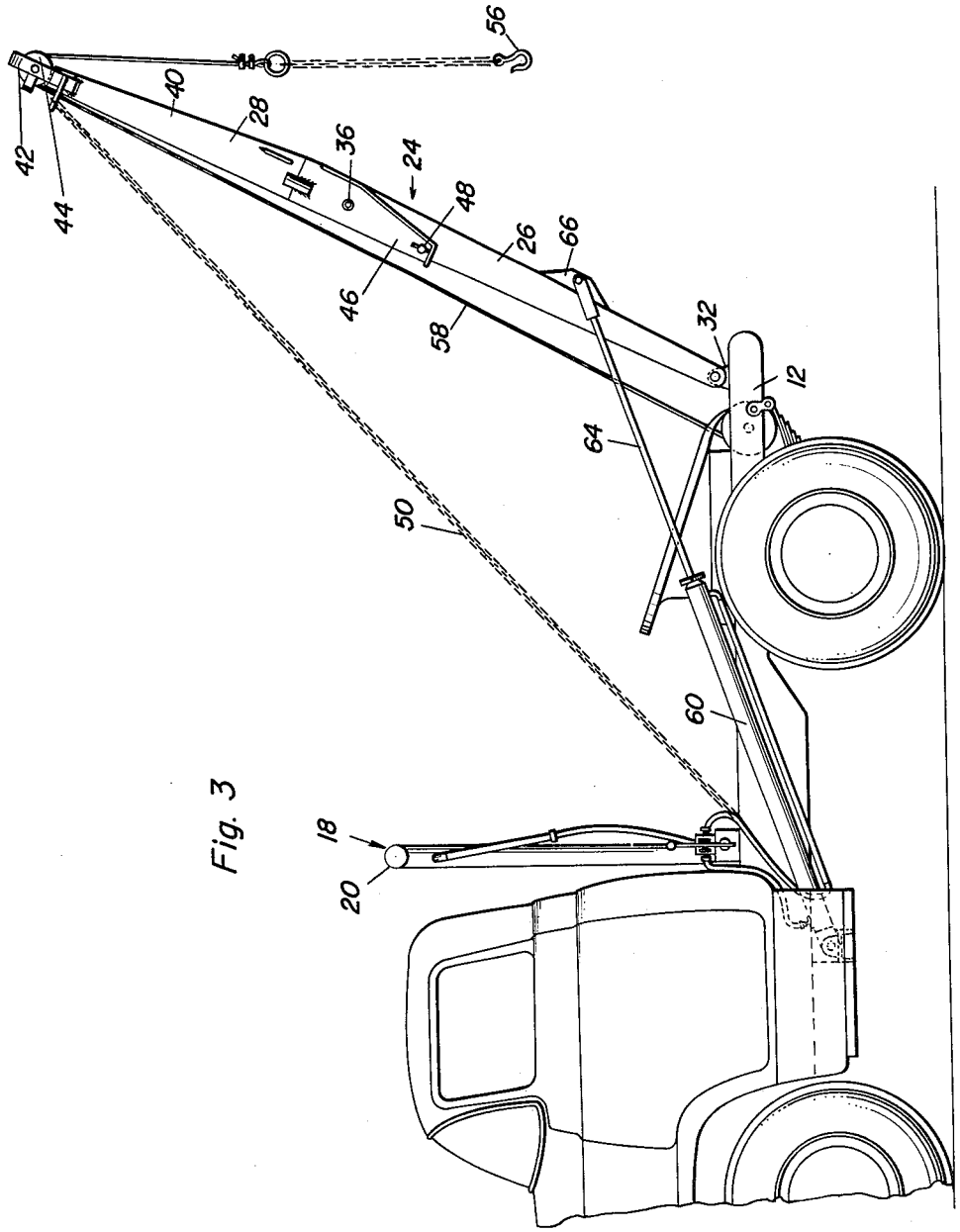
FIGURE 3 is a side elevational view illustrating the folding boom assembly in its rigidly extended load sustaining position.

Referring now to the drawings in detail it will be observed that the folding boom assembly which is generally referred to by reference numeral 10 is mounted on the truck frame generally referred to by reference numeral 12 of a truck tractor type vehicle which also includes the cab 14 forwardly thereof and a coupling table 16 disposed rearwardy of the vehicle for purposes of connecting a truck trailer thereto as is well known in the art. Also disposed rearwardly of the cab 14 and mounted on the truck frame 12, is a cab guard 18 which includes the top guard rail member 20 disposed slightly above the height of the cab 14 for protection thereof in the usual manner but also for coaction with the folding boom in a novel manner as will be hereafter described. The boom assembly 10 is mounted on the vehicle frame 12 rearwardly of the cab guard 18 and includes a power operated mechanism generally referred to by reference numeral 22 which is operatively connected to the boom generally referred to by reference numeral 24.

The boom 24 as illustrated in FIGURE 1 is in a folded position and is composed of a pair of sections 26 which are pivotally connected or mounted on the vehicle frame 12 and a second pair of boom sections which are pivotally connected to the other sections 26 approximately at the center of the boom 24. As seen in FIGURE 1, the sections 26 are disposed horizontally on the vehicle frame 12 while the sections 28 thereof are disposed vertically in spaced relation behind the cab guard 18. In FIGURE 2, the boom 24 is in an extended condition but retracted with the section 28 thereof resting against the cab guard 18. In FIGURE 3, the boom 24 is in its extended rigid load sustaining position overhanging and extending upwardly from the rear of the vehicle frame 12. The boom sections 26 and 28 are preferably made of a box steel construction. The sections 26 are interconnected at their lower ends by a pivot shaft 30 as more clearly seen in FIGURES 4 and 5, the pivot shaft 30 being journalled between a pair of journal brackets 32 mounted on the sides of the vehicle frame 12. The boom 24 is accordingly pivotally mounted by the frame 12 for movement between its retracted and extended positions. The boom sections 26 are also interconnected adjacent the other ends thereof by a brace member 34 as more clearly seen in FIGURE 5. The boom sections 28 on the other hand are pivotally connected to the boom sections 26 by pivot bearing member 36 and also are interconnected by a cross brace member 38. The boom sections 28 include also portions 40 which converge toward each other and are interconnected at an outward end by a bracket member 42 within which a cable pulley 44 is rotatably mounted. The lower portions of the boom sections 28 include portions 46 which extend beyond the interconnecting pivot bearing member 36 for contact with the lower boom sections 26 to resist further pivotal displacement between the boom sections in one direction from its extended position. Suitable lock elements 48 are accordingly provided for insertion within aligned apertures in the extended portion 46 of the boom sections 28 and the boom sections 26 for locking the boom sections in their extended condition for the boom assembly. Accordingly, a rigid extended boom assembly is provided for load sustaining purposes.

When the boom assembly is in its load sustaining extended position as illustrated in FIGURE 3, anchoring chains 50 are provided and are connected at opposite ends to the vehicle frame 12 adjacent to the cab guard 18 and to the upper end of the boom 24 so as to provide a rigid boom for load handling purposes. Accordingly, a cable 58 is entrained about the pulley 44 and connected at one end to a cable winch 52 which is rotatably mounted by the vehicle frame forwardly of the boom pivot shaft 30 and adjacent thereto as more clearly seen in FIGURE 4 and also below the coupling table 16. A power take-off 54 from the truck is accordingly provided and selectively controlled for powering the winch 52. The other end of the cable 58 is connected to a load engaging hook member 56.

The power operated mechanism 22 for retracting and extending the boom 24 includes a pair of hydraulic cylinder devices 60 which are pivotally mounted at a forward end on opposite sides of the vehicle frame 12 by a cross channel support member 62. A piston rod 64 connected to a piston disposed within the cylinder devices 60 extends outwardly from the cylinder devices 60 and are pivotally connected to bracket formations 66 on the boom sections 26. It will therefore be apparent that when the piston rod 64 is retracted as illustrated in FIGURE 1 so will be the boom 24 with the section 26 resting on the vehicle frame, the boom sections 28 disposed vertically with the extending portion 46 thereof. The boom 24 will accordingly be safely and conveniently disposed in its folded position when finally retracted. Extension of the piston rod by a certain amount and upward pivoting of the cylinder devices 60 as a result thereof will cause upward movement of the boom 24 causing pivotal displacement between the boom sections 26 and the boom sections 28 with the boom sections 28 resting on the top guard rail 20 of the cab guard and sliding with respect thereto until the boom 24 is in an extended condition as illustrated in FIGURE 2. The locking element 48 may then be applied so as to hold the boom in its extended condition. Thereafter, further extension of the piston rod 64 from the cylinder device 60 will cause the boom to be pivoted in its extended condition to its load carrying position as illustrated in FIGURE 3. The anchoring chain 50 will then be taut. When the boom 24 is to be retracted, the piston rods 64 are retracted within by cylinder device 60 causing the boom 24 to be pivoted rearwardly until it rests on top of the cab guard 18. The locked elements 48 may then be removed and the chain 50 conveniently held on supporting hooks 68. Further retraction of the piston rod 64 within the cylinder devices 60 will then cause the boom 24 to fold from the position illustrated in FIGURE 2 to the position illustrated in FIGURE 1. The cab guard accordingly cooperates with the aforesaid further retraction of the piston rods within the cylinder devices to effect the final retraction and folding of the boom 24.

Referring now to FIGURE 6 it will be observed that the cylinder devices 60 have a pair of fluid conducting conduits 70 and 72 connected to opposite ends thereof for the purpose of supplying fluid under pressure to the opposite ends of the cylinder device 60 for extending or retracting the piston rods 64. The conduits 70 and 72 from each of the cylinder devices 60 are accordingly connected to a valve box 74 which in turn is hydraulically connected by the conduit 76 to the discharge end of a hydraulic pump 78, the inlet of which is connected by conduit 80 to a fluid reservoir 82 for the supply of actuating fluid to the hydraulic system. The fluid is preferably oil and the pump 78 may be driven by a power take-off drive 84 from the truck transmission. As will be seen more clearly in FIGURE 4, the pump 78 and valve box 74 are disposed to one lateral side just rearwardly of the cab guard with the side of the valve box 74 exposing the valve controlled lever 86 whereby the valve box 74 may be actuated in either direction from a neutral position for either retracting or extending the piston rod by supply of fluid under pressure to one or the other end of the cylinder devices 60. In connection with the fluid system, which is disposed adjacent to the cab guard and toward one side thereof, it will be observed that the cab guard top rail member 20 is supported by a pair of tubular support members 88, the one tubular support member adjacent to the valve box 74 and pump 78 conveniently constituting the oil reservoir 82, as more clearly seen in FIGURE 7. Accordingly, the conduit 80 connected to the inlet of the pump 78 is connected to the tubular member 88 within which the hydraulic fluid or oil is disposed. Also provided is an air bleed valve 90 and a drain connection 92. It will be further noted, that the guard rail member 20 which is welded to the tubular support members 88 is further braced by means of the brace members 94 which also conveniently serve as hangers for the load engaging hook member 56.

From the foregoing description, operation and utility of the folding boom assembly of the present invention and its installational environment will be apparent. It will therefore be appreciated, that the present invention features a folding boom assembly which is foldable and retracted in a novel and unique manner by the aforementioned cooperation between the boom, cab guard and hydraulic actuating mechanism to retract the boom and fold it into a more convenient space providing both rigid support therefor and a greater measure of safety. The boom may also be extended into a position in which substantial loads may be accommodated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a truck tractor having a forward cab, a truck frame and a cab guard mounted rearwardly of said cab on the truck frame, a boom assembly comprising, folding upper and lower pivoted sections of a boom means pivotally mounted on the rear end of said truck frame for overhanging projection rearwardly and upwardly from the truck frame in a rigidly extended load sustaining position, power operated means mounted on the truck frame and operatively connected to the boom means lower section for pivotally retracting the boom means in an extended condition against the cab guard and subsequently operative in cooperation with the cab guard to further retract the boom means into a folded condition with the pivot means of said sections disposed adjacent said cab guard.

2. The combination of claim 1 including pivot means pivotally interconnecting the boom sections at approximately the center of the boom means, lock means for locking the sections against pivotal displacement relative to each other when disposed at 180° with respect to each other in an extended condition, one of said sections being pivotally mounted on the truck frame at a rear end thereof, the other of the boom sections having a portion extending beyond the pivot means for resisting pivotal displacement in one direction.

3. The combination of claim 2 wherein said power operated means comprises hydraulic piston means pivotally mounted at a forward end by the truck frame and operatively connected to said lower boom section for retraction thereof from the rigidly extended position to a fully retracted position substantially horizontal and resting on the truck frame wherein said upper boom section is disposed in a vertical position adjacent to the cab guard with the extending portion thereof projecting below the truck frame.

4. The combination of claim 3, wherein said power operated means further includes fluid reservoir means, pump means operatively connected to the reservoir means, control valve means disposed on one lateral side of the truck frame adjacent to the cab guard for selective actuation thereof and operatively connecting said pump means to the piston means.

5. The combination of claim 4, wherein said cap guard comprises a pair of vertical tubular support members mounted on the truck frame laterally spaced from each other, a cross guard member supported by said support members in a horizontal position above the cab, one of said tubular support members constituting the reservoir means for the power operated means.

6. The combination of claim 5, including cable winch means mounted on the truck frame adjacent the rear end thereof, pulley means mounted at one end of the boom means, cable means for connection to a load and chain anchoring means connected to the boom means at said one end thereof and to the truck frame.

7. In combination with a truck tractor having a forward cab, a truck frame and cab guard mounted rearwardly thereof on the truck frame, a boom assembly comprising, folding boom means pivotally mounted on the track frame for overhanging projection rearwardly and upwardly from the truck frame in a rigidly extended load sustaining position, power operated means mounted on the truck frame and operatively connected to the boom means for pivotally retracting the boom means in an extended condition against the cab guard and subsequently operative in cooperation with the cab guard to further retract the boom means into a folded condition, said power operated means comprising hydraulic piston means pivotally mounted at a forward end upon the truck frame and operatively connected to said boom means for retraction thereof from the rigidly extended position to a folded position disposed against the truck frame and cab guard, said power operated means further including fluid reservoir means, pump means operatively connected to the reservoir means, control valve means disposed on one lateral side of the truck frame adjacent to the cab guard for selective actuation thereof and operatively connecting said pump means to the piston means.

8. The combination of claim 7, wherein said cab guard comprises a pair of vertical tubular support members mounted on the truck frame laterally spaced from each other, a cross guard member supported by said support members in a horizontal position above the cab, one of said tubular support members constituting the reservoir means for the power operated means.

9. The combination of claim 1, including cable winch means mounted on the truck frame adjacent the rear end thereof, pulley means mounted at one end of the boom means, cable means connected to the winch means and entrained about the pulley means for connection to a load and chain anchoring means connected to the boom means at said one end thereof and to the truck frame.

References Cited in the file of this patent
UNITED STATES PATENTS 2,919,107  Halbrook et al. _____ Dec. 29, 1959
2,996,195  Hansen _____ Aug. 15, 1961